United States Patent
Tabary et al.

(10) Patent No.: US 7,579,977 B2
(45) Date of Patent: Aug. 25, 2009

(54) METHOD OF MEASURING THE SPEED OF AIR BY DOPPLER RADAR

(75) Inventors: Pierre Tabary, Paris (FR); Laurant Perier, Les Clayes sous Bois (FR)

(73) Assignee: Mateo-France, Paris (FR)

( * ) Notice: Subject to any disclaimer, the term of this patent is extended or adjusted under 35 U.S.C. 154(b) by 7 days.

(21) Appl. No.: 11/921,242

(22) PCT Filed: May 30, 2006

(86) PCT No.: PCT/FR2006/001220

§ 371 (c)(1),
(2), (4) Date: Jan. 2, 2008

(87) PCT Pub. No.: WO2006/129006

PCT Pub. Date: Dec. 7, 2006

(65) Prior Publication Data

US 2008/0211714 A1  Sep. 4, 2008

(30) Foreign Application Priority Data

Jun. 2, 2005 (FR) .................................. 05 05607

(51) Int. Cl.
*G01S 13/95* (2006.01)
*G01S 13/58* (2006.01)
(52) U.S. Cl. .................. 342/26 R; 342/26 B; 342/104; 342/114; 342/115; 342/195
(58) Field of Classification Search .............. 342/26 R, 342/26 A–26 D, 59, 104, 114–115, 195
See application file for complete search history.

(56) References Cited

U.S. PATENT DOCUMENTS 5,175,551 A * 12/1992 Rubin ....................... 342/26 D
5,623,267 A * 4/1997 Wurman ................... 342/26 D (Continued)

FOREIGN PATENT DOCUMENTS

EP  0 791 838 A1  8/1997

(Continued)

OTHER PUBLICATIONS

"Bistatic coherent laser radar performance. [Wind remote sensing]", Magee, E.P.; Kane, T.J.; Frehlich, R.G. Geoscience and Remote Sensing Symposium Proceedings, 1998. IGARSS '98. 1998 IEEE International, Jul. 6-10, 1998 P(s):2433-2435 vol. 5.*

(Continued)

*Primary Examiner*—John B Sotomayor
(74) *Attorney, Agent, or Firm*—Muncy, Geissler, Olds & Lowe, PLLC

(57) ABSTRACT

A method of measuring the speed of air in a zone of the atmosphere by the Doppler effect by means of a radar, the method comprising the steps of transmitting bursts of three pulses at different rates $F_1$, $F_2$, $F_3$; determining respective speeds $V_1$, $V_2$, $V_3$ of the air from the pulses received in return from the pulses in each burst; and calculating the speed V of the air from the speeds $V_1$, $V_2$, $V_3$ determined for the returned pulses received for each burst.

10 Claims, 3 Drawing Sheets

U.S. PATENT DOCUMENTS

| | | | |
|---|---|---|---|
| 5,796,364 | A | 8/1998 | Fuchter et al. |
| 5,808,580 | A | 9/1998 | Andrews, Jr. |
| 6,097,329 | A | 8/2000 | Wakayama |
| 6,232,912 | B1 | 5/2001 | Nagel |
| 6,456,229 | B2 * | 9/2002 | Wurman et al. ............... 342/59 |
| 6,522,295 | B2 * | 2/2003 | Baugh et al. ................ 342/453 |
| 6,710,743 | B2 * | 3/2004 | Benner et al. ............... 342/453 |
| 2007/0069941 | A1 * | 3/2007 | Pearlman et al. .......... 342/26 B |
| 2008/0211714 | A1 * | 9/2008 | Tabary et al. ............. 342/26 R |

FOREIGN PATENT DOCUMENTS

| | | |
|---|---|---|
| EP | 0 919 834 A1 | 6/1999 |
| EP | 1 431 774 A1 | 6/2004 |
| FR | 2 736 161 A1 | 1/1997 |
| WO | WO 2006/129006 A1 * | 12/2006 |

OTHER PUBLICATIONS

"Target location and speed estimation by multistatic radar system using maximum likelihood approach", Yang Wenlin; Wei Chongyu Signal Processing Proceedings, 2000. WCCC-ICSP 2000. 5th International Conference on, 2000 P(s):1964-1967 vol. 3.*

"A novel signal processing approach for microwave Doppler speed sensing", Weber, N.; Moedl, S.; Hackner, M. Microwave Symposium Digest, 2002 IEEE MTT-S International vol. 3, 2002 (s):2233-2235.*

* cited by examiner

METHOD OF MEASURING THE SPEED OF AIR BY DOPPLER RADAR

CROSS REFERENCE TO RELATED APPLICATIONS

This application is a U.S. National Stage of International Application PCT/FR2006/001220 filed May 30, 2006, for which priority is claimed, and this application claims priority of Application No. 05 05607 filed in France on Jun. 2, 2005 under 35 U.S.C. § 119; the entire contents of all of which are hereby incorporated by reference.

The present invention relates to a method of measuring the speed of air in a zone of the atmosphere.

BACKGROUND OF THE INVENTION

In meteorology, it is known to measure the speed of air by means of a radar using the Doppler effect: the radar transmits trains of sinusoidal waves or pulses that are returned to the radar by particles in suspension in the air; if the air is moving in such a manner as to cause the particles to move away from or towards the radar, then the pulses returned to the radar present a phase shift relative to the pulses it transmitted, which shift can be used for calculating the radial speed of the particles relative to the radar, and thus the speed of the air carrying the particles. Speed can thus be determined without ambiguity providing the real speed of the particles lies within a so-called Nyquist range that depends on the pulse repetition rate (also known as repetition frequency). If the real speed of the particles lies outside that range, then the speed that is calculated is equal to the real speed modulo the width of the Nyquist range. The calculated speed is then said to be folded into the Nyquist range.

To increase the width of this range, it is known to increase the repetition rate of the pulses. Nevertheless, that leads to a certain number of drawbacks, and in particular to strongly stressing the transmitter, to the transmitter consuming a large amount of energy, and to a reduction in the range of the radar.

It is also possible to use a radar of longer wavelength. Nevertheless, such a radar is expensive.

It is also known to transmit bursts of pulses at first and second pulse repetition rates, with one rate taking the place of the other after each burst (the so-called dual pulse repetition frequency (PRF) method). By combining the speeds calculated from the pulses received in return from the pulses transmitted during successive bursts, the speed of the particles can be determined without ambiguity in a larger Nyquist range. Nevertheless, since the radar antenna is revolving continuously, the zone of the atmosphere to which a burst is transmitted at the first repetition rate is slightly different from the zone to which the following burst is transmitted at the second repetition rate. This results in inaccuracy in determining speed, and this inaccuracy increases when the radar is located in a zone where air speeds present high levels of local variation and where the radar rotates at a high speed.

OBJECT OF THE INVENTION

It would therefore be advantageous to have means enabling the speed of the air to be determined accurately within a Nyquist range that is relatively large.

BRIEF SUMMARY OF THE INVENTION

For this purpose, the invention provides a method of measuring the speed of air in a zone of the atmosphere by the Doppler effect using a radar, the method comprising the steps of:

transmitting bursts of three pulses at different rates $F_1$, $F_2$, $F_3$;

determining respective speeds $V_1$, $V_2$, $V_3$ of the air from the pulses received in return from the pulses in each burst; and calculating the speed V of the air from the speeds $V_1$, $V_2$, $V_3$ determined for the returned pulses received for each burst.

Thus, each pulse is transmitted at a rate that is different from that of the following pulses. The Nyquist interval is then obtained by combining the three repetition rates so that the Nyquist interval is relatively large. The pulses at the three repetition rates are transmitted in succession towards a common zone of the atmosphere, thereby limiting the inaccuracy of the method.

Preferably, calculating the speed V of the air comprises the stages of:

calculating the Nyquist speeds $V_{n1}$, $V_{n2}$, $V_{n3}$ corresponding to each rate $F_1$, $F_2$, $F_3$ and calculating the equivalent Nyquist speed $V_{neq}$;

for each value of an integer $\underline{k}$ varying over the range $[-V_{neq}/2V_{n1}+\frac{1}{2}; V_{neq}/2V_{n1}+\frac{1}{2}]$:

calculating a speed $V_{test}=V_1+2\,kV_{n1}$;

folding the speed $V_{test}$ into the ranges $[-V_{n2}, V_{n2}]$ and $[-V_{n3}, V_{n3}]$ to obtain the speeds $V_2'$ and $V_3'$; and calculating the differences $\Delta V_2 = V_2' - V_2$ and $\Delta V_3 = V_3' - V_3$ and the root-mean-square deviation $E = \sqrt{((\Delta V_2^2 + \Delta V_3^2)/2)}$; and retaining as the speed V, the speed $V_{test}$ corresponding to the smallest root-mean-square deviation.

This mode of calculation is found to be relatively reliable and simple to implement by computer while using computer resources that are relatively small.

Advantageously, the rates $F_1$, $F_2$, $F_3$ are relatively close.

This leads to the radar transmitter being stressed relatively little and therefore limits wear thereof.

In a particular implementation, the method includes a step of determining said rates $F_1$, $F_2$, $F_3$ by performing the following stages:

determining pairs p/q and r/s such that $\underline{p}$ and $\underline{q}$ and also $\underline{r}$ and $\underline{s}$ are mutually prime, $\underline{q}$ and $\underline{s}$ are greater than $\underline{p}$ and $\underline{r}$, respectively, $\underline{p}$ is greater than q/2, and $\underline{r}$ is greater than s/2;

selecting a rate $F_1$ and calculating a corresponding Nyquist speed $V_{n1}$;

selecting a speed V' corresponding to the maximum speed of air in the measurement zone and folding the speed V' into the range $[-V_{n1}, V_{n1}]$ to obtain the speed $V_1'$;

for each pair p/q and r/s:

calculating rates $F_2 = F_1 \times p/q$ and $F_3 = F_1 \times r/s$ and calculating the Nyquist speeds $V_{n2}$ and $V_{n3}$;

calculating the equivalent Nyquist speed $V_{neq} = 1\,\mathrm{cm}(p, r) \times V_{n1}$;

for each value of an integer $\underline{k}$ varying over the range $[-V_{neq}/2V_{n1}+\frac{1}{2}; V_{neq}/2V_{n1}+\frac{1}{2}]$:

calculating a speed $V_{test}=V_1'+2\,kV_{n1}$;

folding the speed $V_{test}$ into the ranges $[-V_{n2}, V_{n2}]$ and $[-V_{n3}, V_{n3}]$ to obtain the speeds $V_2'$ and $V_3'$;

calculating the differences $\Delta V_2 = V_2' - V_2$ and $\Delta V_3 = V_3 - V_3$ and calculating the root-mean-square deviation $E = \sqrt{((\Delta V_2^2 + \Delta V_3^2)/2)}$; and retaining the speed $V_{test}$ that corresponds to the smallest root-mean-square deviation; and comparing the speeds $V_{test}$ obtained for all of the pairs with the speed V' to select the best pair.

This determination technique is relatively simple, reliable, and fast.

The comparison then advantageously comprises the stages of calculating, for all of the pairs, the difference $\Delta'=V_{test}-V'$ and verifying whether $\Delta'$ is less than half the Nyquist speed $V_{n1}$.

This comparison technique combines simplicity and effectiveness.

Also preferably, the method includes the stage of allocating noise to the speeds $V_1'$, $V_2'$, and $V_3'$ prior to using them in the calculations, the noise corresponding to the noise specific to the radar and to the atmospheric conditions that are usual in the measurement zone, and the step of folding the speeds $V_1'$, $V_2'$, and $V_3'$ made noisy in this way into the ranges $[-V_{n1}, V_{n1}]$, $[-V_{n2}, V_{n2}]$, and $[-V_{n3}, V_{n3}]$ to obtain the speeds $V_1'$, $V_2'$, and $V_3'$ used subsequently in the calculations.

It is thus possible to determine repetition rates that are optimized for the zone of the atmosphere in which speed measurements are performed.

Other characteristics and advantages of the invention appear on reading the following description of a particular, non-limiting implementation of the invention.

BRIEF DESCRIPTION OF THE DRAWINGS

Reference is made to the accompanying drawings, in which.

DETAILED DESCRIPTION OF THE INVENTION

With reference to the figures, the method in accordance with the invention is implemented by means of a Doppler radar suitable for transmitting bursts of pulses with the repetition rate changing between each pulse.

Figure 3:
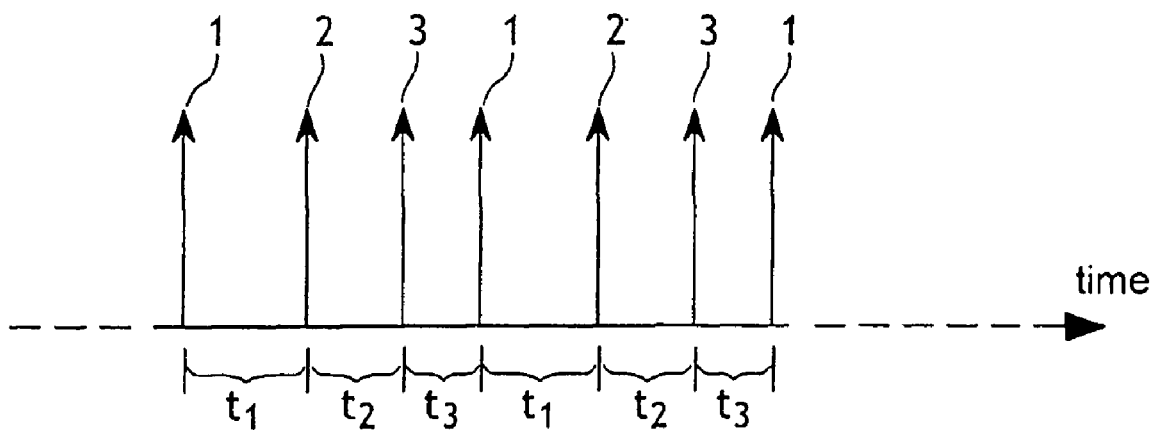
FIG. 3 is a diagram showing pulse transmission over time.

To measure the speed of air, the method of the invention begins with step 30 of transmitting bursts of three pulses 1, 2, 3 at different rates $F_1$, $F_2$, $F_3$ (the duration $t_1$ between the pulses 1 and 2 is different from the duration $t_2$ between the pulses 2 and 3, and the duration $t_3$ between the pulse 3 of one burst and the pulse 1 of the following burst is likewise different from the durations $t_1$ and $t_2$, see FIG. 3).

When a pulse encounters particles in suspension in the air, the particles reflect a pulse back to the radar.

The method thus continues with a step 40 of determining speeds $V_1$, $V_2$, $V_3$ of the air on the basis of the pulses received in return from the pulses 1, 2, and 3 in each burst. The way in which the speeds $V_1$, $V_2$, $V_3$ are calculated is itself known and relies on the following formula:

$$V = Fd \times \lambda/2$$

where Fd is the frequency shift of the received pulse compared with the transmitted pulse (also known as the Doppler frequency).

The speed V of the air is then calculated from the speeds $V_1$, $V_2$, $V_3$ determined for the pulses received in return from each burst (step 50).

Calculating the speed V of the air requires the Nyquist speeds $V_{n1}$, $V_{n2}$, $V_{n3}$ to have been calculated corresponding to each repetition rate $F_1$, $F_2$, $F_3$, and also requires the equivalent Nyquist speed $V_{neq}$ to have been calculated (step 20). It is recalled that the Nyquist speed is equal to the product of the wavelength of the pulse multiplied by the repetition rate divided by 4. By way of example:

$$V_{n1} = \lambda \times F_1/4$$

The equivalent Nyquist speed $V_{neq}$ is calculated from the ratio of the rate relating to the rate $F_1$ and the Nyquist speed $V_{n1}$ as explained below in the description of the step of determining rates.

Thereafter, an integer number $\underline{k}$ is caused to vary over the range $[-V_{neq}/2\,V_{n1}+\frac{1}{2}; V_{neq}/2V_{n1}+\frac{1}{2}]$ and for each value of $\underline{k}$ in the range:

a speed $V_{test}=V_1+2\,kV_{n1}$ is calculated;

the speed $V_{test}$ is folded into the ranges $[-V_{n2}, V_{n2}]$ and $[-V_{n3}, V_{n3}]$ to obtain speeds $V_2^{\,1}$ and $V_3^{\,1}$. $V_2^{\,1}=V_{test}$ modulo $(2V_{n2})$ and $V_3^{\,1}=V_{test}$ modulo $(2V_{n3})$; and the differences $\Delta V_2=V_2^{\,1}-V_2$ and $\Delta V_3=V_3^{\,1}-V_3$, and the root-mean-square deviation $$E = \sqrt{((\Delta V_2^2 + \Delta V_3^2)/2)}$$

are calculated.

Then the root-mean-square deviations obtained for all of the values of $\underline{k}$ are compared with one another and the speed $V_{test}$ corresponding to the smallest root-mean-square deviation is retained as being the speed V of the air (step 60).

Figure 1:
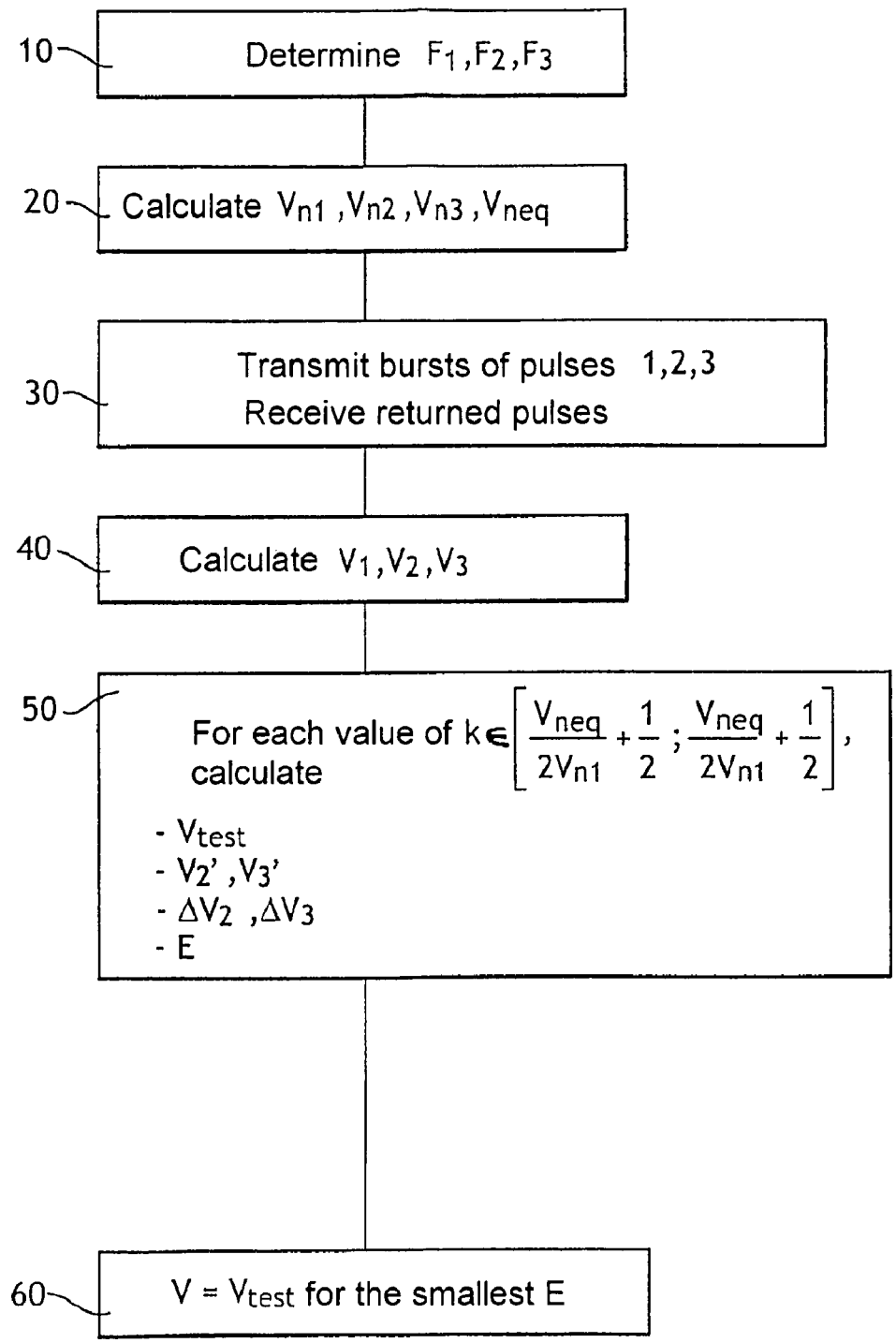
FIG. 1 is a flow chart showing the general sequence of the method of the invention.
Figure 2:
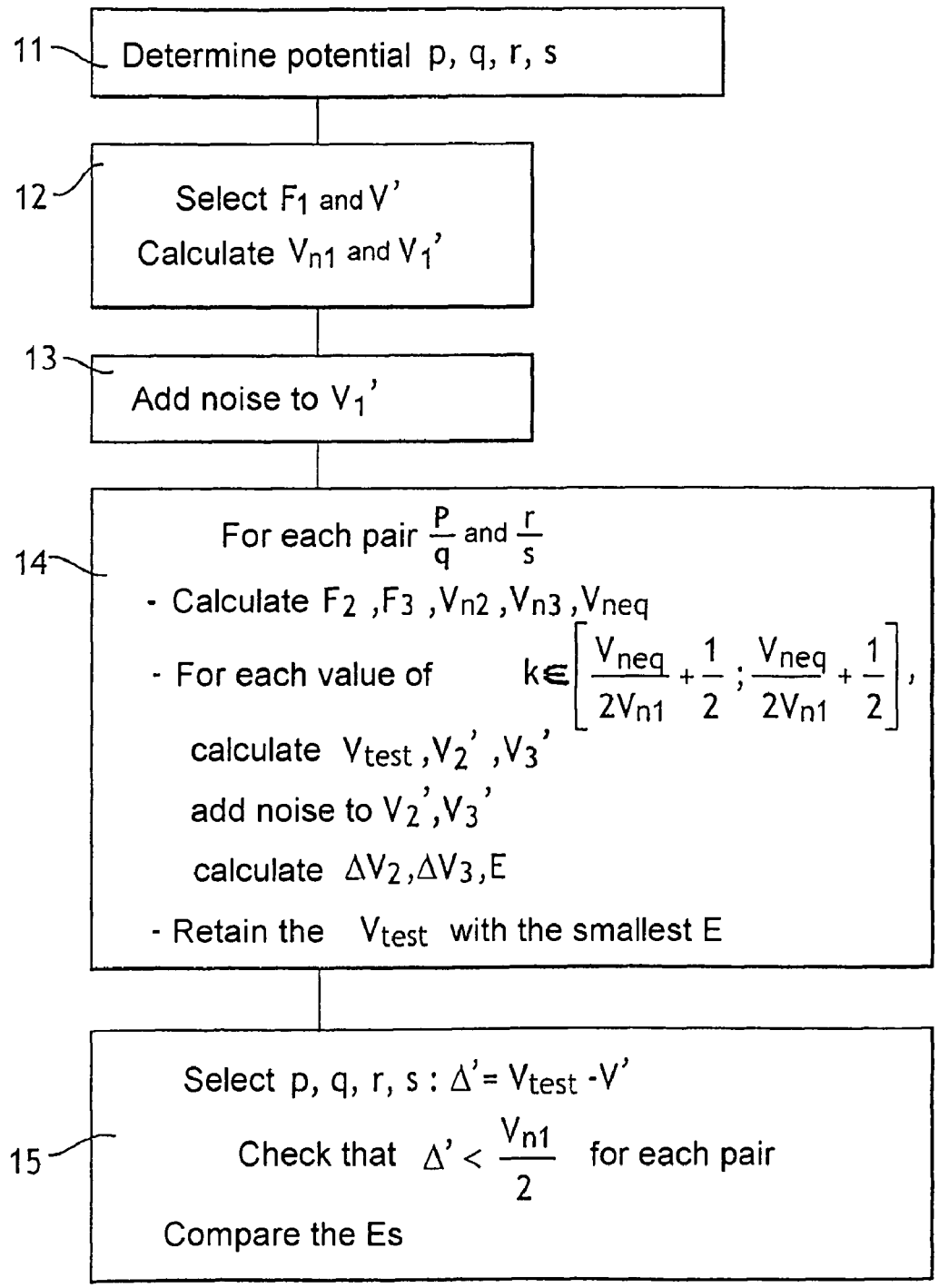
FIG. 2 is a flow chart showing the sequence of the step of determining frequencies in accordance with the invention.

To enable the method of the invention to be implemented, it is necessary previously to have determined the pulse repetition rates $F_1$, $F_2$, and $F_3$. Step 10 of determining the rates $F_1$, $F_2$, and $F_3$ is shown in detail in FIG. 2 and begins with a stage 11 of determining pairs of parameter ratios p/q and r/s that are used for defining the rates $F_2$ and $F_3$ as a function of $F_1$:

$$F_2 = F_1 \times p/q \text{ and } F_3 = F_1 \times r/s$$

Preferably, in order to optimize the search for these pairs, constraints are imposed in selecting the para-meters $\underline{p}$, $\underline{q}$, $\underline{r}$, and $\underline{s}$:

$\underline{p}$ and $\underline{q}$ and also $\underline{r}$ and $\underline{s}$ are mutually prime;

$\underline{q}$ and $\underline{s}$ are greater than $\underline{p}$ and $\underline{r}$, respectively;

p/q is greater than r/s;

$\underline{p}$ is greater than q/2; and $\underline{r}$ is greater than s/2.

The parameters $\underline{p}$ and $\underline{r}$ are advantageously greater than q/2 and s/2 respectively, to ensure that the rates $F_2$ and $F_3$ are not much less than the rate $F_1$, since if they were that would run the risk of causing wear in the magnetron of the radar.

In practice, in order to restrict the number of possibilities, the value of $\underline{p}$ can be limited to 11.

In addition, it has been found that for maximum effectiveness of the method, the parameter $\underline{q}$ is preferably equal to p+1.

The step of determining pulse repetition rates is continued by a stage 12 during which the first repetition rate $F_1$ is selected as a function of technical characteristics of the radar and of the corresponding calculated Nyquist speed $V_{n1}$. A speed V' corresponding to the maximum speed of air in the measurement zone is folded into the Nyquist range $[-V_{n1}, V_{n1}]$ to obtain the speed $V_1'$, i.e. $V_1'=V'$ modulo $(2\times V_{n1})$. During stage 13, noise corresponding to the noise specific to the radar and to the usual atmospheric conditions in the measurement zone is allocated to the speed $V_1'$, and the speed $V_1'$ made noisy in this way is folded as before into the range $[-V_{n1}, V_{n1}]$ to obtain the speed $V_1'$ that is used subsequently in the calculations. The noise added to the speed $V_1'$ is noise with Gaussian distribution, zero mean, and a standard deviation that can be parameterized in such a manner that the noise corresponds to the noise encountered under conditions of use.

The following operations are then performed for each pair p/q and r/s (stage 14):

calculating the rates $F_2=F_1 \times p/q$ and $F_3=F_1 \times r/s$ and the corresponding Nyquist speeds $V_{n2}$, $V_{n3}$;

calculating the equivalent Nyquist speed $V_{neq}$ by multiplying the Nyquist speed $V_{n1}$ by the least common multiple of the parameters p and r ($V_{neq}=1$ cm (p,r)$\times V_{n1}$)

for each value of integer k varying in the range $[[-V_{neq}/2V_{n1}+\frac{1}{2}; V_{neq}/2V_{n1}+\frac{1}{2}]$;

calculating a speed $V_{test}=V_1'+2\,kV_{n1}$;

folding the speed $V_{test}$ into the ranges $[-V_{n2}, V_{n2}]$ and $[-V_{n3}, V_{n3}]$ to obtain the speeds $V_2'$ and $V_3'$;

as for the speed $V_1'$, allocating noise to the speeds $V_2'$ and $V_3'$, which noise corresponds to the noise specific to the radar and to the usual atmospheric conditions in the measurement zone, and folding the speeds $V_2'$ and $V_3'$ made noisy in this way into the ranges $[-V_{n2}, V_{n2}]$ and $[-V_{n3}, V_{n3}]$ to obtain the speeds $V_2'$ and $V_3'$ used subsequently in the calculations; and calculating the differences $\Delta V_2 = V_2' - V_2$ and $\Delta V_3 = V_3' - V_3$ and the root-mean-square deviation $$E = \sqrt{((\Delta V_2^2 + \Delta V_3^2)/2)}$$

retaining the speed $V_{test}$ that corresponds to the smallest root-mean-square deviation.

The step of determining the pulse repetition rates terminates by comparing (15) the speeds $V_{test}$ obtained for all of the pairs with the speed V' in order to select the best pair. This comparison comprises stages of calculating for all of the pairs the difference $\Delta' = V_{test} - V'$, comparing the differences $\Delta'$, and verifying whether $\Delta'$ is less than half the Nyquist speed $V_{n1}$. In order to refine the selection of the best pair, it is also possible to compare the root-mean-square deviation obtained by looking for the pair presenting the difference $\Delta'$ and the root-mean-square deviation E that are the smallest, or the pair giving the best compromise between these two quantities.

By way of example, given the atmospheric conditions in France, and more particularly air turbulence in this country, the following parameters give satisfactory results: p=6, q=7, r=4, s=5, or p=7, q=8, r=2, and s=3.

Thus, by selecting a rate $F_1$ at 375 Hz, using the first of the parameters, the following values are obtained $F_2$=321 Hz and $F_3$=300 Hz.

These parameters can naturally be used for any zone presenting conditions similar to those encountered in France.

Naturally, the invention is not limited to the implementation described, and variant implementations can be devised without going beyond the ambit of the invention as defined by the claims.

The method of determining frequencies can be implemented for several different levels of noise so as to evaluate the pertinence of the pairs retained compared with the levels of noise encountered.

The numerical values are given purely by way of indication, and other values could naturally be used.

The invention claimed is:

1. A method of measuring the speed of air in a zone of the atmosphere by the Doppler effect using a radar, the method comprising the steps of:

transmitting bursts of three pulses at different rates $F_1$, $F_2$, $F_3$;

determining respective speeds $V_1$, $V_2$, $V_3$ of the air from the pulses received in return from the pulses in each burst; and calculating the speed V of the air from the speeds $V_1$, $V_2$, $V_3$ determined for the returned pulses received for each burst.

2. A method according to claim 1, wherein calculating the speed V of the air comprises the stages of:

calculating the Nyquist speeds $V_{n1}$, $V_{n2}$, $V_{n3}$ corresponding to each rate $F_1$, $F_2$, $F_3$, and calculating the equivalent Nyquist speed $V_{neq}$;

for each value of an integer k varying over the range $[-V_{neq}/2V_{n1}+\frac{1}{2}; V_{neq}/2V_{n1}+\frac{1}{2}]$:

calculating a speed $V_{test}=V_1'+2kV_{n1}$;

folding the speed $V_{test}$ into the ranges $[-V_{n2}, V_{n2}]$ and $[-V_{n3}, V_{n3}]$ to obtain the speeds $V_2'$ and $V_3'$; and calculating the differences $\Delta V_2 = V_2' - V_2$ and $\Delta V_3 = V_3' - V_3$ and the root-mean-square deviation $E = \sqrt{((\Delta V_2^2 + \Delta V_3^2)/2)}$; and retaining as the speed V, the speed $V_{test}$ corresponding to the smallest root-mean-square deviation.

3. A method according to claim 1, wherein the rates $F_1$, $F_2$, $F_3$ are relatively close.

4. A method according to claim 1, wherein the rates $F_2$ and $F_3$ are respectively $F_1 \times 6/7$ and $F_1 \times 4/5$.

5. A method according to claim 3, wherein the rates $F_2$ and $F_3$ are respectively $F_1 \times 7/8$ and $F_1 \times 2/3$.

6. A method according to claim 1, including a step of determining said rates $F_1$, $F_2$, $F_3$ by performing the following stages:

determining pairs p/q and r/s such that p and q and also r and s are mutually prime, q and s are greater than p and r, respectively, p is greater than q/2, and r is greater than s/2;

selecting a rate $F_1$ and calculating a corresponding Nyquist speed $V_{n1}$;

selecting a speed V' corresponding to the maximum speed of air in the measurement zone and folding the speed V' into the range $[-V_{n1}, V_{n1}]$ to obtain the speed $V_1'$;

for each pair p/q and r/s:

calculating rates $F_2=F_1 \times p/q$ and $F_3=F_1 \times r/s$ and calculating the Nyquist speeds $V_{n2}$ and $V_{n3}$;

calculating the equivalent Nyquist speed $V_{neq}=1$ cm(p, r)$\times V_{n1}$);

for each value of an integer k varying over the range $[[-V_{neq}/2V_{n1}+\frac{1}{2}; V_{neq}/2V_{n1}+\frac{1}{2}]$:

calculating a speed $V_{test}=V_1'+2kV_{n1}$;

folding the speed $V_{test}$ into the ranges $[-V_{n2}, V_{n2}]$ and $[-V_{n3}, V_{n3}]$ to obtain the speeds $V_2'$ and $V_3'$;

calculating the differences $\Delta V_2 = V_2' - V_2$ and $\Delta V_3 = V_3' - V_3$ and calculating the root-mean-square deviation $E = \sqrt{((\Delta V_2^2 + \Delta V_3^2)/2)}$; and retaining the speed $V_{test}$ that corresponds to the smallest root-mean-square deviation; and comparing the speeds $V_{test}$ obtained for all of the pairs with the speed V' to select the best pair.

7. A method according to claim 6, wherein the comparison comprises the stages of calculating, for all of the pairs, the difference $\Delta' = V_{test} - V'$ and verifying whether $\Delta'$ is less than half the Nyquist speed $V_{n1}$.

8. A method according to claim 6, wherein the comparison comprises a stage of comparing the root-mean-square deviations obtained for all of the pairs.

9. A method according to claim 6, including the stage of allocating noise to the speeds $V_1'$, $V_2'$ and $V_3'$ prior to using them in the calculations, the noise corresponding to the noise specific to the radar and to the atmospheric conditions that are usual in the measurement zone, and the step of folding the speeds $V_1'$, $V_2'$, and $V_3'$ made noisy in this way into the ranges $[-V_{n1}, V_{n1}]$, $[-V_{n2}, V_{n2}]$, and $[-V_{n3}, V_{n3}]$ to obtain the speeds $V_1'$, $V_2'$, and $V_3'$ used subsequently in the calculations.

10. A method according to claim 6, wherein the parameter q is equal to p+1.

* * * * *